United States Patent [19]

van der Lely

[11] 4,058,168

[45] Nov. 15, 1977

[54] ROTARY HARROWS

[76] Inventor: Cornelis van der Lely, 7, Bruschenrain, Zug, Switzerland

[21] Appl. No.: 696,836

[22] Filed: June 17, 1976

Related U.S. Application Data

[63] Continuation of Ser. No. 552,596, Feb. 24, 1975, abandoned, which is a continuation of Ser. No. 338,155, March 5, 1973, abandoned.

[30] Foreign Application Priority Data

Mar. 3, 1972 Netherlands .......................... 7202809

[51] Int. Cl.$^2$ ............................................. A01B 33/06
[52] U.S. Cl. ................................. 172/59; 172/111; 172/112
[58] Field of Search ..................... 172/49, 59, 111–113, 172/522–526

[56] References Cited

U.S. PATENT DOCUMENTS 3,774,689  11/1973  Lely et al. ............................ 172/112
3,809,166  5/1974  Lely et al. ........................ 172/59 X Primary Examiner—Edward M. Coven
Assistant Examiner—Paul T. Sewell
Attorney, Agent, or Firm—Mason, Mason & Albright

[57] ABSTRACT

A rotary harrow has a frame for attachment to a prime mover, a portion of the frame having generally vertical shafts with soil-working members journalled therein and arranged side-by-side in a row that extends transverse to the direction of travel. Each soil-working member includes a generally horizontal support, the inner end of which is connected to its respective shaft and the outer end extends radially from the shaft with a tine holder for retaining a single upright tine. Adjacent soil-working members are driven in opposite directions and the working members can be arranged in groups which are positioned out of phase with respect to one another. A screening member is connected to the support to extend in the direction of rotation and protect the upper part of the soil-working members, including its bearings against debris thrown during operation.

6 Claims, 6 Drawing Figures

ROTARY HARROWS

This is a continuation of application Ser. No. 552,596 filed Feb. 24, 1975, which is a continuation of Ser. No. 338,155 filed Mar. 5, 1973, both abandoned.

According to the invention, there is provided a rotary harrow of the kind set forth, wherein each soil working member or rotor is provided with at least one tine at only one side of the corresponding axis of rotation, and wherein the tines of each group of soil working members or rotors which are arranged to rotate in during the use of the harrow are angularly out of phase relative to one another about the corresponding axes of rotation.

Figure 1:
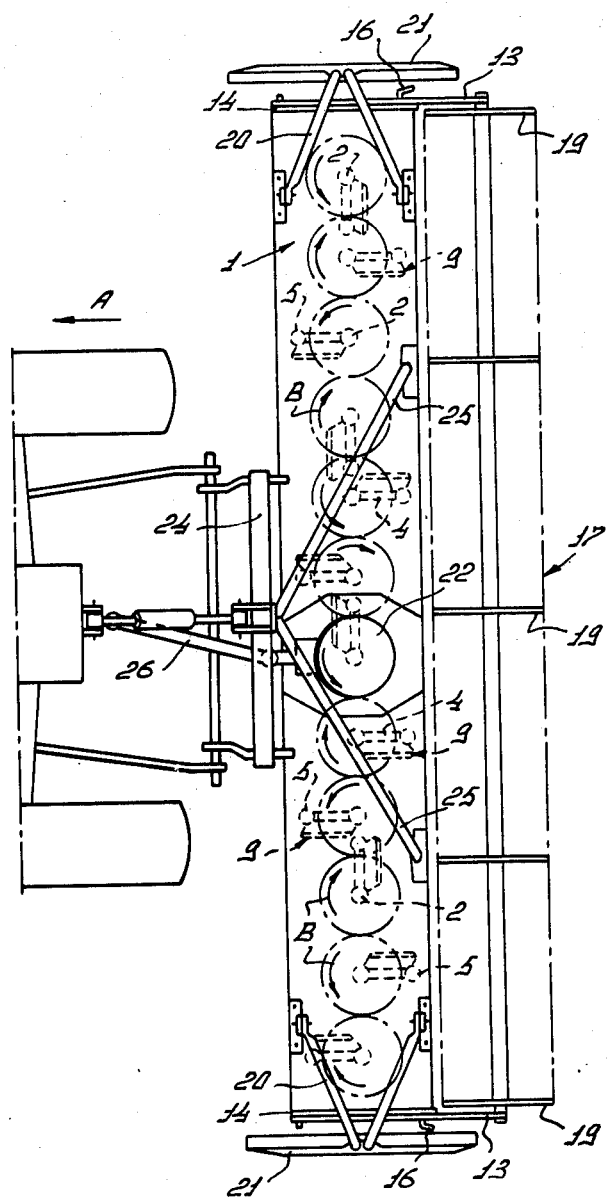
Figure 2:
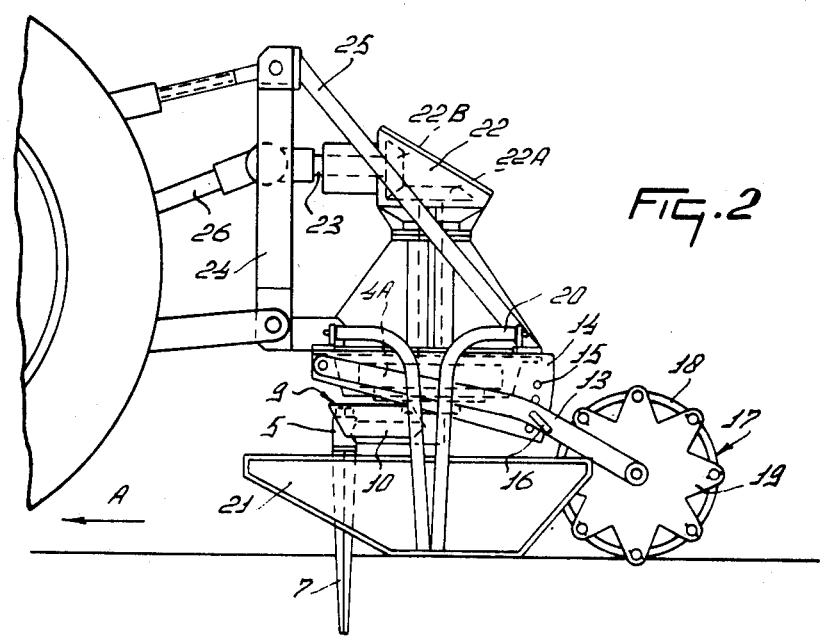
Figure 3:
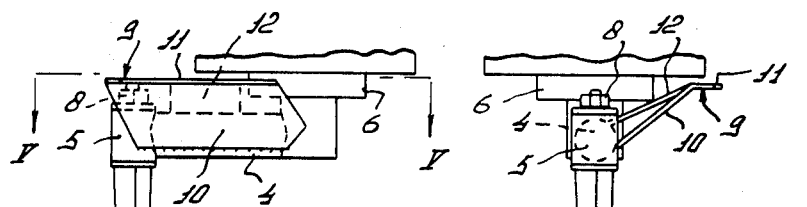
Figure 3:
Figure 4:
Figure 5:
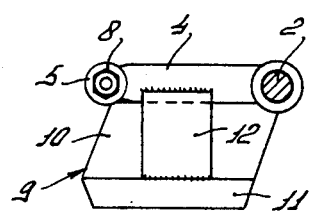
Figure 6:
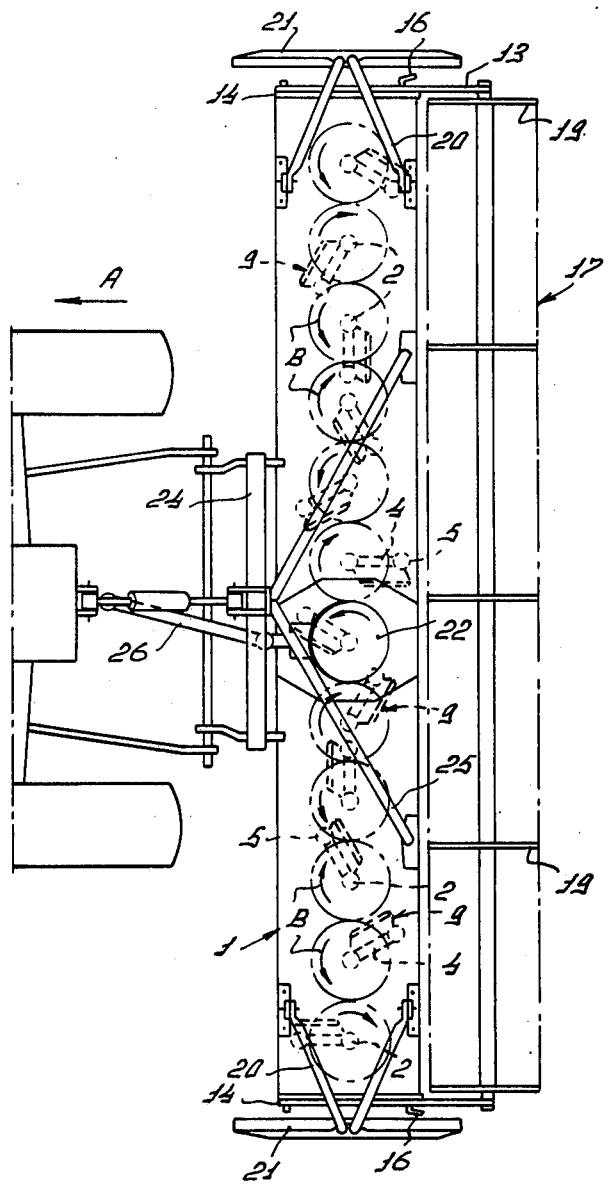

For a better understanding of the invention, and to show how the same may be carried into effect, reference will now be made, by way of example, to the accompanying drawings, in which:

FIG. 1 is a plan view of a rotary harrow in accordance with the invention connected to the rear of an agricultural tractor, FIG. 2 is a side elevation corresponding to FIG. 1, FIG. 3 is a scrap elevation, to an enlarged scale, showing a tine of the harrow, and parts that are associated therewith, that can be seen in FIG. 2, in greater detail, FIG. 4 is a view as seen in the direction indicated by an arrow IV in FIG. 3, FIG. 5 is a section taken on the line V—V in FIG. 3, and FIG. 6 corresponds to FIG. 1 but shows the tines of the soil working members of the harrow disposed in a different positional relationship to that illustrated in FIG. 1.

Referring to the drawings, the rotary harrow that is illustrated has a frame portion 1 that is afforded principally by a hollow beam of sheet iron or other sheet metal construction that extends substantially horizontally perpendicular to the intended direction of operative travel of the harrow which is indicated by an arrow A in FIGS. 1 and 6 of the drawings. The hollow beam of the frame portion 1 accommodates a row of twelve vertical or substantially vertical shafts 2 that are arranged in side-by-side relationship with each shaft 2 carrying a corresponding soil working member or rotor that is generally indicated by the reference 3 at its lower end. It is emphasised that a rotary harrow having 12 shafts 2 and corresponding soil working members or rotors 3 is described only by way of example and that a harrow in accordance with the invention could equally well comprise a greater or lesser number of such shafts and soil working members. The shafts 2 are rotatably mounted in substantially vertical bearings 6 lodged in recesses in the lower surface of the hollow beam affording the frame portion 1 and the axes of rotation of neighbouring shafts 2 are preferably spaced apart from one another by perpendicular distances of substantially 25 centimeters. The top of the hollow beam which affords the frame portion 1 is in the form of a substantially flat plate bolted to substantially horizontally disposed rims of the remainder of the beam which latter is of generally channel-shaped configuration. Each shaft 2 is provided inside the hollow beam with a corresponding pinion 4A having straight or spur teeth and it will be seen from FIGS. 1 and 6 of the drawings that the teeth of the twelve (in the example which is being described) pinions 4A are all in mesh with those of their neighbour or neighbours in the row.

The lower ends of the twelve shafts 2 project from beneath the corresponding bearings 6 at the bottom of the frame portion 1 and are there provided with corresponding horizontally or substantially horizontally disposed tine supports 4 each of which projects from the corresponding shaft 2 in only one substantially radial direction. The end of each support 4 that is remote from the corresponding shaft 2 carries a substantially vertically disposed sleeve-like tine holder 5 that receives an upper fastening portion of a corresponding single tine 7 that projects substantially perpendicularly downwards from beneath the holder 5. The fastening portions of the tines 7 have screw-threaded upper extremities which receive nuts 8 that are tightened to center the tines 7 in their holders 5 and prevent undesired detachment of the tines from the holders.

In FIG. 1 of the drawings, neighboring soil-working members or rotors 3 rotate in relative opposite directions and are arranged in two groups with each member of one group being flanked by members of a second group. The tine supports 4 of consecutive soil-working members of each group are out of phase by multiplies of about 90° i.e., 90°, 180° or 270°, from one another measured clockwise when the leftmost support of the first group extends about 180° with respect to the first leftmost support of the second group. With such a phase difference, a smooth and steady operation of the harrow is attained.

It can be seen from FIGS. 3, 4 and 5 of the drawings that each tine support 4 is provided with a deflector for stones and other potentially damaging objects, said deflector taking the form of a screen 9 one edge of which is welded or otherwise rigidly secured to the corresponding shaft 2, support 4 and holder 5 and which is inclined forwardly and upwardly from that edge with respect to the intended direction of rotation B of the corresponding soil working member or rotor 3. Each screen 9 is afforded principally by a plate that extends throughout substantially the whole of length of the corresponding tine support 4, said plate including an inclined portion 10 whose lowermost and rearmost (with respect to the direction B) edge is rigidly secured to the corresponding shaft 2, support 4 and holder 5 as described above. The plate also includes a substantially horizontal free edge portion 11 at the uppermost and leading (with respect to the direction B) extremity of the portion 10. A brace 12 of less width than the remainder of the screen 9 rigidly interconnects a top region of the corresponding tine support 4 and the junction between the two portions 10 and 11 of the plate principally affording the screen 9.

Two arms 13 are turnable upwardly and downwardly about substantially horizontally aligned pivots located at the opposite ends of the frame portion 1 and at the front thereof with respect to the direction A, said arms 13 extending rearwardly from the pivots with respect to the direction A. The arms 13 move alongside substantially sector-shaped plates 14 that are fastened to the opposite ends of the frame portion 1 so as to lie in substantially vertical planes extending substantially parallel to the direction A. Each plate 14 is formed adjacent a rearward curved edge thereof with an arcuately curved row of holes 15 each of which is at the same distance from the axis afforded by the pivots that connect the arms 13 directly or indirectly to the frame portion 1. Each arm 13 is provided with a substantially horizontal locking pin 16 whose tip can be entered in any chosen one of the corresponding curved row of holes 15 to maintain that arm in a corresponding angular setting about the axis afforded by the pivots that have just been mentioned. A soil compression member in the form of a roller 17 is rotatably mounted between the rearmost ends of the two arms 13 so that said roller 17 lies just behind the frame portion 1 and soil working members or rotors 3 with respect to the direction A. The roller 17 comprises a plurality, such as five, of regularly spaced apart substantially vertical support plates 19 and a plurality, such as eight, of elongated tubular elements 18 that are entered loosely through holes in the peripheries of the support plates 19 in such a way as to be wound helically to some extent around the axis of rotation of the roller.

Plates 21 are disposed immediately beyond the opposite ends of the row of soil working members or rotors 3 and bear slidably against the ground surface by their lowermost edges during the use of the harrow. The plates 21 are connected by pairs of arms 20 to substantially horizontal pivots affording axes that extend substantially parallel to the direction A and said plates 21 can thus turn upwardly and downwardly to match undulations in the surface of the ground over which the harrow is travelling during the use thereof. Moreover, the plates 21 and their supporting arms 20 can be turned upwardly through substantially 180° about their pivotal connections with the top of the frame portion 1 to bring them to inverted positions that are suitable for the inoperative transport of the harrow in which positions they bear downwardly against the top plate of the frame portion 1. The shaft 2 of one of the center pair of the twelve soil working members or rotors 3 has an upward extension through the top of the frame portion 1 into a gear box 22 which is accordingly located slightly to the left of the center of the harrow as viewed from the rear in the direction A. The extension shaft which has just been mentioned is provided, inside the gear box 22, with a bevel pinion 22A whose teeth are in driven mesh with those of a smaller bevel pinion 22B mounted on a rotary input shaft 23. The rotary input shaft 23 extends substantially parallel to the direction A, its rear end that carries the pinion 22B being located inside the gear box 22 while its leading forwardly projecting end is splined or otherwise keyed for connection to the power take-off shaft of an operating agricultural tractor or other vehicle by way of an intermediate telescopic transmission shaft 26 of known construction having universal joints at its opposite ends. The front of the frame portion 1 with respect to the direction A is provided with a generally triangular coupling member 24 arranged for connection to the lifting links of the three-point lifting device or hitch of an operating agricultural tractor or other vehicle in the manner which is shown in outline in the drawings. Two tie rods 25 rigidly interconnect the apex of the coupling member 24 and horizontally spaced apart anchorages at the top and rear, with respect to the direction A, of the frame portion 1, said tie rods 25 converging towards the coupling member 24 when the harrow is viewed in plan (FIGS. 1 and 6).

In the use of the rotary harrow that has been described, its coupling member 24 is connected to the three-point lifting device or hitch of an agricultural tractor or other operating vehicle in the manner shown in the drawings and the rotary input shaft 23 of the gear box 22 is placed in driven connection with the power take-off shaft of the same tractor or other vehicle by way of the intermediate telescopic transmission shaft 26. As the harrow is moved over the ground, the soil working members or rotors 3 rotate in the opposite directions that are indicated by arrows B in FIG. 1 of the drawings, it being preferred that said members or rotors 3 should rotate at speeds of substantially 500 revolutions per minute and certainly not less than substantially 400 revolutions per minute. Since the paths traced by the tips of the tines 7 during rotation of the shafts 2 overlap one another, the harrow will effectively work a single broad strip of land provided that the soil working members or rotors 3 thereof rotate at the speed just noted. As previously mentioned, the arrangement of the tine supports 4 and tines 7 of neighbouring soil working members or rotors 3 in staggered relationship about the axes of rotation of the shafts 2 so as to be not more than 180° cut of phase with one another ensures a smooth and steady operation of the harrow and avoids any appreciable tendency to lateral reciprocatory of the frame portion 1. Since each soil working member or rotor 3 has at least one tine 7 at only one side of the corresponding rotary shaft 2, large gaps are left between the tines 7 during operation thus greatly reducing the tendency for stones, pieces of wood, roots and other hard objects on or in the soil to become jammed between the tines. The deflectors that are afforded by the screens 9 fastened to the tine supports 4 tend to direct any stones or other objects of the kind which have just been mentioned downwardly to a level beneath that of the tine supports 4 and the retaining nuts 8 that are disposed above the upper ends of the tine holders 5. The tines 7 which have been described and illustrated project substantially perpendicularly downwards towards the ground surface but these tines may be replaced by tines whose lower soil working portions are inclined at a few degrees to the vertical and downwardly and rearwardly with respect to the intended directions of rotation B. Such tines may be said to "trail" with respect to the directions of rotation B and the use of such trailing tines has been found to be particularly advantageous in the working of heavy soil.

The rotary harrow illustrated in FIG. 6 of the drawings is identical to that already described with reference to FIGS. 1 to 5 thereof with the exception of the relative disposition of the tine supports 4 and tines 7 of the various soil working members or rotors 3. In the arrangement illustrated in FIG. 6 of the drawings, there are two groups of soil working members or rotors 3 each of which groups totals six in number. The six soil working members or rotors 3 of one group rotate in one direction and the six which comprise the other group rotate in the opposite direction and it will accordingly be realised that each soil working member or rotor 3 of any one group is flanked at both its opposite sides by two soil working members or rotors 3 of the other group with the exceptions of the two soil working members or rotors 3 that are located at the opposite ends of the single row thereof. Each group of soil working members or rotors 3 comprises six thereof and the tine support 4 and tines 7 of each member or rotor 3 are angularly displaced around the axes of the corresponding shafts 2 by 360° divided by the number of members of the group (i.e. six) relative to the next member of the group. Thus, each member of the group has its tine support 4 and single tine 7 substantially 60° out of phase around the axis of rotation of the corresponding shaft 2 as compared with the next, or the next and preceding, member of the same group. In order to avoid any fouling of the tines 7, the tine supports 4 and tines 7 of two neighbouring soil working members or rotors 3 of the two different groups are substantially 150° out of phase with one another around the axes of rotation of the shafts 2 as illustrated in FIG. 6 of the drawings. The described arrangement of the tine supports 4 and tines 7 in two groups and of the different supports and tines in one group relative to one another and of the two groups relative to one another produced a particularly smooth and steady operation of the harrow despite the fact that each soil working member or rotor 3 has only one tine at one side of the corresponding axis of rotation.

Although not illustrated in the accompanying drawings, it is to be noted that it is within the scope of the invention to provide each tine support 4 with a group of two or more tines 7 each of which is disposed at substantially the same side of the corresponding shaft 2.

Although certain features of the rotary harrow that has been described and illustrated in the accompanying drawings will be set forth in the following claims as inventive features, it is emphasised that the invention is not necessarily limited to those features and that it includes within its scope all of the parts of the harrow that has been described and/or illustrated both individually and in various combinations.

What we claim is:

1. A rotary harrow having a frame with a plurality of soil-working members journalled in a portion of said frame, said soil-working members comprising upwardly extending shafts rotatably mounted on said frame portion and said shafts being located side by side in a row that extends transverse to the normal direction of travel a single support extending substantially radially from the lower end of each shaft and the inner end of said support being attached to said shaft, soil-working tine means in a holder of said support and said support with tine means being located at only one side of the axis of rotation of said shaft, the distance between said tine means and the shaft of each corresponding soil-working member being greater than half the distance between two neighboring shafts and said members being positioned to work overlapping strips of soil, said shafts being in driving engagement with driving means that rotates adjacent shafts and their corresponding supports in relative opposite directions, pinions on said shafts being in driving engagement with one another and neighboring pinions being in mesh, said soil-working members being arranged in two groups which rotate in relative opposite directions, the members of a first group being flanked at their opposite sides by members of a second group along said row and consecutive soil-working members of each group being out of phase by multiples of about 90° from one another about their respective shafts, and when said harrow is viewed from the rear, the first leftmost support of the first group extending forwardly and about 180°, with respect to the first leftmost support of the second group.

2. A harrow as claimed in claim 1, wherein said support includes a deflector screen that extends forwardly therefrom with respect to the direction of rotation of the support, said deflector screen being inclined upwardly from said support and extending through substantially the whole of the length of said support.

3. A harrow as claimed in claim 2, wherein said deflector screen includes a portion that is inclined upwardly and forwardly with respect to the direction of rotation of said support, said inclined portion being connected at its lower edge to a substantially horizontal portion of said support.

4. A rotary harrow having a frame with a plurality of soil-working members journalled in a portion of said frame, said soil-working members comprising upwardly extending shafts rotatably mounted on said frame portion and said shafts being located side by side in a row that extends transverse to the normal direction of travel, a single support extending substantially radially from the lower end of each shaft and the inner end of said support being attached to said shaft, soil-working tine means in a holder of said support and said support with tine means being located at only one side of the axis of rotation of said shaft, the distance between said tine means and the shaft of each corresponding soil-working member being greater than half the distance between two neighboring shafts and said members being positioned to work overlapping strips of soil, said shafts being in driving engagement with driving means that rotates adjacent shafts and their corresponding supports in relative opposite directions, pinions on said shafts being in driving engagement with one another and neighboring pinions being in mesh, said soil-working members being arranged in two groups which rotate in relative opposite directions, the members of a first group being flanked at their opposite sides by members of a second group along said row and consecutive soil-working members of each group being out of phase about 60° from one another about their respective shafts, and when said harrow is viewed from the rear the first leftmost support of the first group extending substantially 150°, measured clockwise with respect to the first leftmost support of the second group.

5. A harrow as claimed in claim 4, wherein said soil-working members each have a corresponding single tine.

6. A harrow as claimed in claim 5, wherein the shafts of adjacent soil-working members are spaced apart from one another by distances of about 25 cms.

* * * * *